United States Patent
Liberty et al.

(10) Patent No.: US 9,003,378 B2
(45) Date of Patent: Apr. 7, 2015

(54) CLIENT-SIDE APPLICATION SCRIPT ERROR PROCESSING

(75) Inventors: Daniel Liberty, Tel Aviv (IL); Moshe Kravchik, Belt Shemesh (IL)

(73) Assignee: BMC Software, Inc., Houston, TX (US)

(*) Notice: Subject to any disclaimer, the term of this patent is extended or adjusted under 35 U.S.C. 154(b) by 378 days.

(21) Appl. No.: 12/967,456

(22) Filed: Dec. 14, 2010

(65) Prior Publication Data

US 2012/0151274 A1    Jun. 14, 2012

(51) Int. Cl.
*G06F 9/44* (2006.01)
*G06F 11/36* (2006.01)
*G06F 11/07* (2006.01)

(52) U.S. Cl.
CPC .......... *G06F 11/366* (2013.01); *G06F 11/3664* (2013.01); *G06F 11/0766* (2013.01)

(58) Field of Classification Search
CPC ............ G06F 11/0766; G06F 11/0772; G06F 11/0778; G06F 11/3636; G06F 11/3644; G06F 11/3664
USPC .......................... 714/38.1, E11.207; 717/130
See application file for complete search history.

(56) References Cited

U.S. PATENT DOCUMENTS

| | | | |
|---|---|---|---|
| 7,322,027 B2* | 1/2008 | Tousignant | 717/127 |
| 8,245,200 B2* | 8/2012 | Baierl et al. | 717/130 |
| 2007/0006168 A1* | 1/2007 | Dimpsey et al. | 717/130 |
| 2007/0113282 A1* | 5/2007 | Ross | 726/22 |
| 2008/0134148 A1* | 6/2008 | Clark | 717/128 |
| 2010/0180159 A1* | 7/2010 | Bittles et al. | 714/38 |
| 2010/0287414 A1* | 11/2010 | Pardoe et al. | 714/38 |

* cited by examiner

*Primary Examiner* — Qing Chen
*Assistant Examiner* — Andrew M Lyons

(57) ABSTRACT

Systems, methods, and computer readable media for collecting run-time error information for an executing script through the use of a double code-injection technique are described. A first native code injection into a user's client-side application (e.g., a browser application) is made. The second injection is thereafter made by the user's client-side application itself (when the first injected program code is executed) into the application's associated scripting engine and only when a script error has been detected. The second injected program code or scripts collect detailed run-time script error information within the context of the application's scripting engine. The second injected program code can then return the collected error information to the user application's context where it may be provided to a debug tool or recorded for later review (by the first injected program code).

14 Claims, 4 Drawing Sheets

# CLIENT-SIDE APPLICATION SCRIPT ERROR PROCESSING

BACKGROUND

Client-side scripting has become a popular technique used by a large number of Web sites. As used herein, "client-side scripting" refers to a class of Web-based computer programs that are executed by a user's application executing on the user's computer system. Client-side scripts are often embedded within a document being processed by the user's application. Illustrative client-side applications include commercial browser applications and applications that have, embedded within them, browser-like functionality. Illustrative documents include, but are not limited to, HyperText Markup Language (HTML) documents, eXtensible Markup Language (XML) documents and other files containing scripts. During run-time, when the user's application encounters a script in a document it passes the script to a script engine. The script engine runs the script and returns a result value to the application. In practice, some client-side applications may have the ability to use multiple different script engines. In these cases when a script is encountered by the user's client-side application, it first determines what type of script it is and then passes the script to the appropriate script engine.

Illustrative scripting languages include, but are not limited to, JavaScript®, Jscript®, VBScript, XUL, XSLT and Perl. (JAVASCRIPT is a registered trademark of Sun Microsystems, Inc. JSCRIPT is a registered trademark of the Microsoft Corporation.) JavaScript is perhaps the most widely known and used client-side scripting language. It is so common in fact, that techniques involving the combination of an XML/HTML document and JavaScript scripts to improve a user's impression of application responsiveness have become significant enough to acquire a name: AJAX. AJAX scripts are sometimes very complex, spanning thousands to tens of thousands of lines of code. Such large scripts present a difficult debugging challenge. This is particularly true as the user's application and its associated script engines (within which the error occurs) operate in different contexts. It would therefore be beneficial to provide a technique to assist in the process of debugging/troubleshooting large and complex scripts intended for execution by a client-side application.

SUMMARY

In general, systems, methods, and computer readable media for collecting run-time error information for an executing script through the use of a double code-injection technique are described. In one embodiment the invention provides a method to process or respond to a run-time script error. The method includes injecting native program code into a client-side application executing on a computer system (e.g., the Internet Explorer or Firefox browser applications executing on a personal computer or workstation). (INTERNET EXPLORER is a registered trademark of the Microsoft Corporation. FIREFOX is a registered trademark of the Mozilla Foundation.) The native program code may then inject script functions into a scripting engine associated with the client-side application, after which the scripting engine may execute a first of the injected script functions to collect an erring script's run-time information (e.g., a stack trace). Following completion of this data collection and, possibly, other script error processing operations, the injected native program code may call a second of the injected script functions to return the collected script error information. Finally, the injected native program code may record the collected error information by, for example, passing it to a script debugging application or storing it to a log file or other repository.

The described methods may also be performed by a collection of computer systems coupled by a communication network (e.g., a local area network, a wide area network or the Internet). Further, the described methods may be implemented in computer program code and stored on a computer readable medium (e.g., magnetic or optical storage).

DETAILED DESCRIPTION

This disclosure pertains to systems, methods, and computer readable media for collecting run-time error information for an executing script through the use of a double code-injection technique. In general, techniques are disclosed herein for performing a first (native code) injection into a user's client-side application (e.g., a browser application). The second injection is thereafter made by the user's application itself (by the first injected program code) into the application's associated scripting engine and only when a script error has been detected. The second injected code/functions/scripts (referred to herein as "handlers") collect detailed error information within the context of the application's scripting engine. The injected handlers can then return the collected error information to the user application's context where it may be provided to a debug tool or recorded for later review (by the first injected program code).

In the following description, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention. Multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of computer program development having the benefit of this disclosure.

Figure 1A:
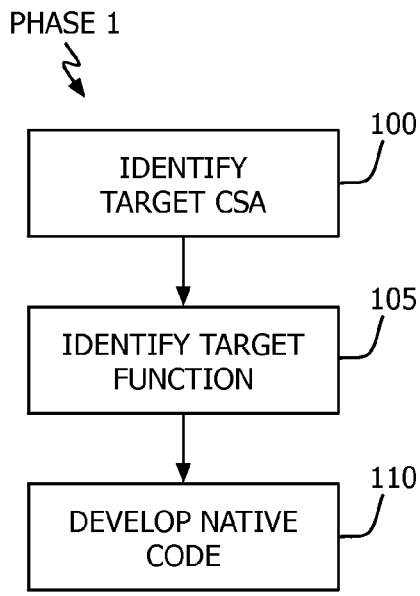
FIGS. 1A and 1B show, in flowchart form, a two phase process in accordance with one embodiment.
Figure 1B:
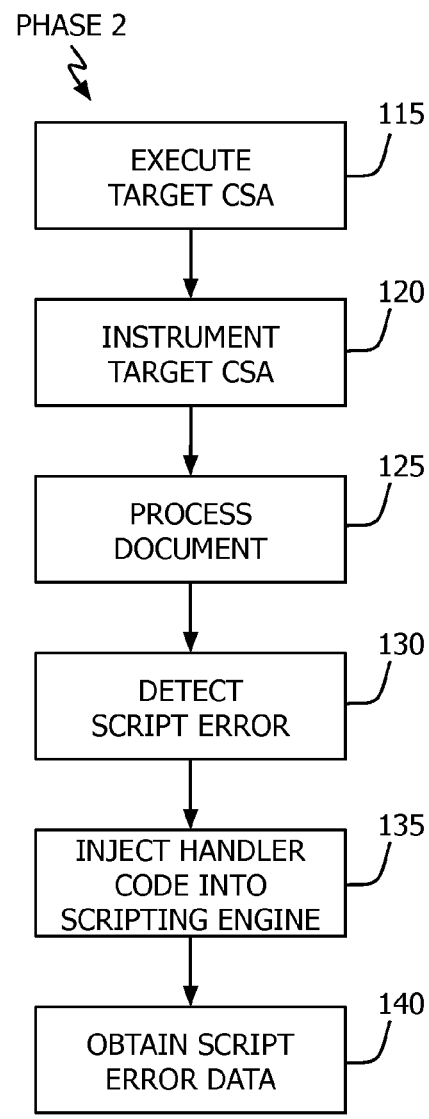

Referring to FIG. 1, an illustrative high-level flowchart of a process in accordance with one embodiment is shown. During a first phase (FIG. 1A), a target client-side application (CSA) is identified for instrumentation (block 100). It is this application's associated scripting engine from which detailed error information is desired. Illustrative target CSAs include, but are not limited to, stand-alone browser applications such as Internet Explorer and Firefox. As used herein, a CSA may also be embodied in an embedded application that provides browser-like functionality—that is, the ability to identify scripts within a document or file and pass those scripts to a scripting engine. A specific CSA function that processes errors from the scripting engine is then identified (block 105) and native CSA program code is developed that, when executed at run-time, injects error handling program code/scripts into the CSA's scripting engine (block 110). It is this latter program code that collects and returns detailed run-time information about an executing script's error.

During operational Phase 2 (FIG. 1B), once the target CSA is executing (block 115) it may be instrumented with the program code developed in accordance with block 110 (block 120). Any convenient native code injection technique may be used to do this. At some time later, the target CSA begins processing a document that contains one or more scripts (block 125). The CSA passes each encountered script to its associated scripting engine in turn which, in due course, returns a result. One illustrative scripting engine executes JavaScript. Another illustrative scripting engine executes JScript. It will be recognized, for example, that the Internet Explorer browser application treats any JavaScript as if it were Microsoft's proprietary JScript language and processes it accordingly. At some point during document processing, the CSA's associated scripting engine detects a run-time script error (block 130). The scripting engine then notifies the CSA which, as a result of the code injected during block 120, injects handlers into the scripting engine (block 135). These handlers, having complete access to the erring script's context (within the scripting engine), collect and return detailed error information to the CSA in a manner described in more detail below (block 140). It will be recognized that code injection in accordance with block 120 may take place at CSA start-up or at a later time by another application (e.g., an application dedicated to code development and to which the collected run-time error information is passed).

Detailed analysis of client-side applications permit the following observations to be made: (1) when an error occurs in a script there is a native function that is called by the scripting engine to notify the CSA of the error; (2) scripting engines generally expose an Application Programming Interface (API) through which program code may be added to, and executed by, the scripting engine; and (3) documents generally include an error script that is passed to the scripting engine for execution on error detection and, further, this function has full access to the erring script's context. Further analysis suggests it is beneficial if the native function identified in (1) is called only after a script error has occurred and at no other time, encapsulates the scripting engine's error handling process, and that the scripting engine is in an internally consistent (and stable) state when the CSA invokes the scripting engine's error function.

Based on the above observations, a CSA function may be instrumented (using native code injection techniques) to, itself, inject program code into its associated scripting engine as outlined in FIG. 1. This double code-injection technique is a novel and non-obvious approach to obtaining detailed run-time script error information and being able to return this information to a scripting debug environment or log file. This approach is transparent to the instrumented CSA and, further, injects program code into the scripting engine only when an error is detected. This latter feature eliminates processing overhead for those scripts that do not generate an error.

An illustrative embodiment will now be described in which the client-side application is Microsoft's Internet Explorer (IE) and the scripting engine executes JavaScript or JScript. Applying the above analysis to this run-time environment identifies IActiveScriptSite::OnScriptError as IE's script error handling function (i.e., that function called by the scripting engine to notify IE that a script error has been detected) and window.onerror( ) as the conventional document error handling function (i.e., that function called by IE to cause the scripting engine to "handle" the detected script error).

In accordance with FIG. 1A, a priori to performing any run-time script error processing, native program code for IE is developed that will, when injected into IE, cause IE to, on script error detection: (1) replace the document's existing window.onerror( ) function by injecting one or more newly developed handlers into the JavaScript engine—the purpose of which is to collect targeted script error information; (2) subsequently permit the JavaScript engine's original window.onerror( ) function to execute; (3) call one or more of the previously injected newly developed handlers to return the collected script error information; and (4) record the collected script error information (e.g., in a log file) and/or pass it to another application for further processing (e.g., a JavaScript debug application).

It has been determined that detailed run-time script error information, while available within the context of a scripting engine, is generally stored in a non-documented and/or proprietary format. For this reason it is not possible for native program code injected into a client-side application to directly retrieve the desired error information from the scripting engine. The double-injection technique described herein is a novel and non-obvious approach to collecting and obtaining such information.

Figure 2A:
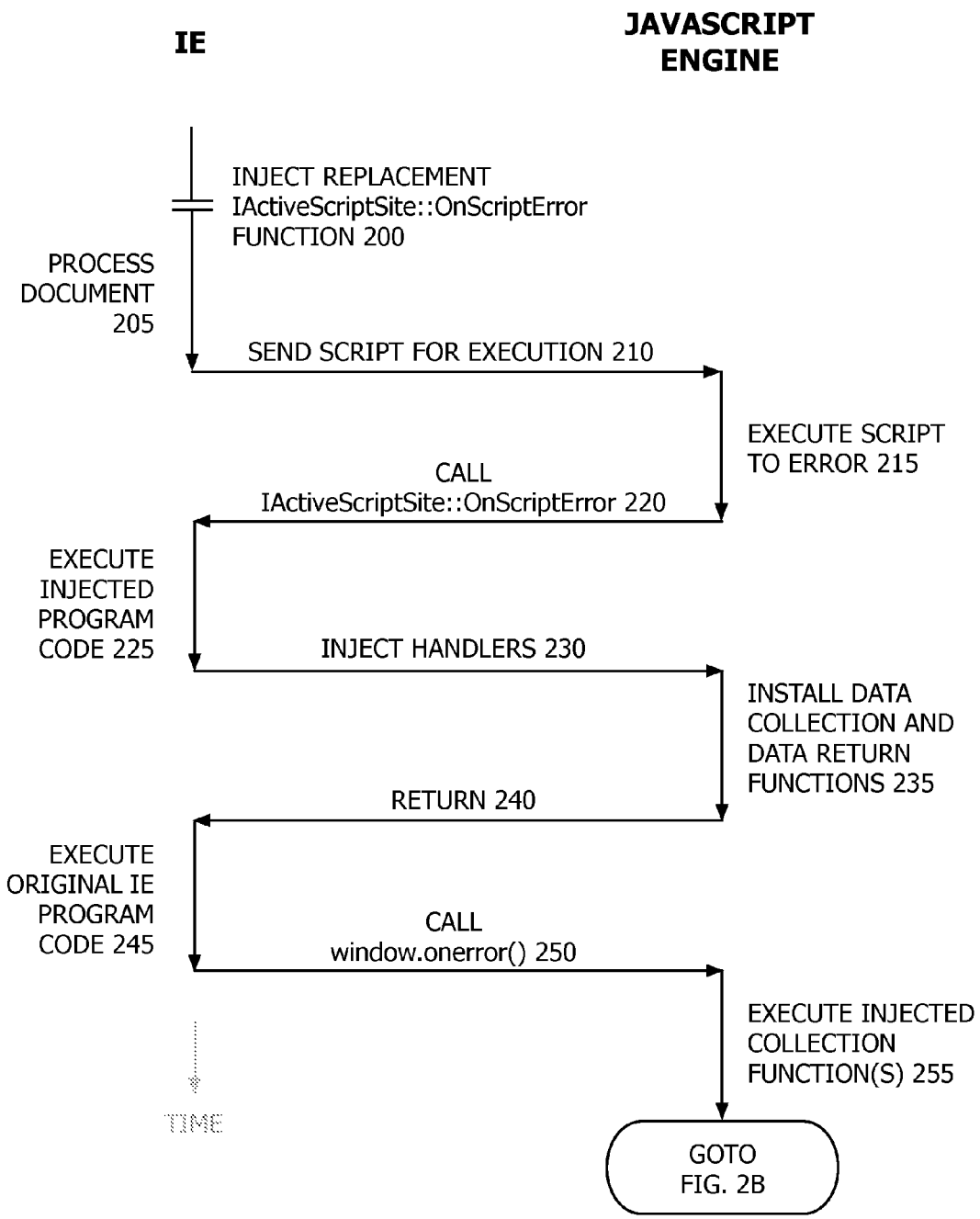
FIGS. 2A and 2B show, in flowchart form, the operational exchanges between an instrumented client-side application (Internet Explorer) and a scripting engine (a JavaScript engine) in accordance with one embodiment.

With phase 1 complete in accordance with FIG. 1A, run-time script error processing in accordance with one embodiment is illustrated in FIG. 2. Referring first to FIG. 2A, at some point in time the program code developed in accordance with block 110 to replace IE's original IActiveScriptSite:: OnScriptError error handling function may be injected into an executing instance of IE (200). As previously noted, this may be accomplished using any convenient native code injection technique. It is further noted that action 200 may be performed such that it has no effect on any other executing instance of IE or the rest of the computer system upon which the now-instrumented IE executes. In one embodiment, instrumentation 200 may occur without stopping or exiting an executing IE instance.

IE may then process a document such as, for example, an HTML page containing JavaScript (205). When IE encounters a JavaScript script in the document, it passes that function to its associated JavaScript engine (210). The JavaScript engine executes the script until an error occurs (215). On detecting an error the JavaScript engine calls to IE using the IActiveScriptSite::OnScriptError error handling function (220). This invokes the native program code injected in accordance with 200 (225). This, in turn, calls the JavaScript engine's API to tell it to add (230) one or more functions (i.e., JavaScript functions) (230 and 235), the result of which is to replace the document's original error handling function and, in addition, install a data return function (described below). When these actions are complete, the JavaScript engine returns control to IE's instrumented program code (240) which then passes control to IE original program code (245) which calls the document's error handling function window.onerror( ) (250). It has been determined to be beneficial to have original (i.e., non-instrumented) IE program code invoke the window.onerror( ) function because the replacement IActiveScriptSite::OnScriptError error handling function (i.e., the program code injected in accordance with 200) does not generally have ready access to the parameters necessary to successfully invoke window.onerror( ). In the IE environment, these parameters include an error message, the Universal Resource Locator (URL) at which the error occurred and the line number within the document being processed at which the error occurred.

IE's call into the JavaScript engine invokes the substitute window.onerror( ) function injected in accordance with 230. One or more functions so injected collect the erring script's detailed run-time error data (255). For example, in one embodiment the script's stack trace information may obtained and stored in a scripting engine's global variable. In another embodiment, stack trace and other error information may be obtained and passed directly to a recording application or written to an external repository (e.g., a data file or database).

Figure 2B:
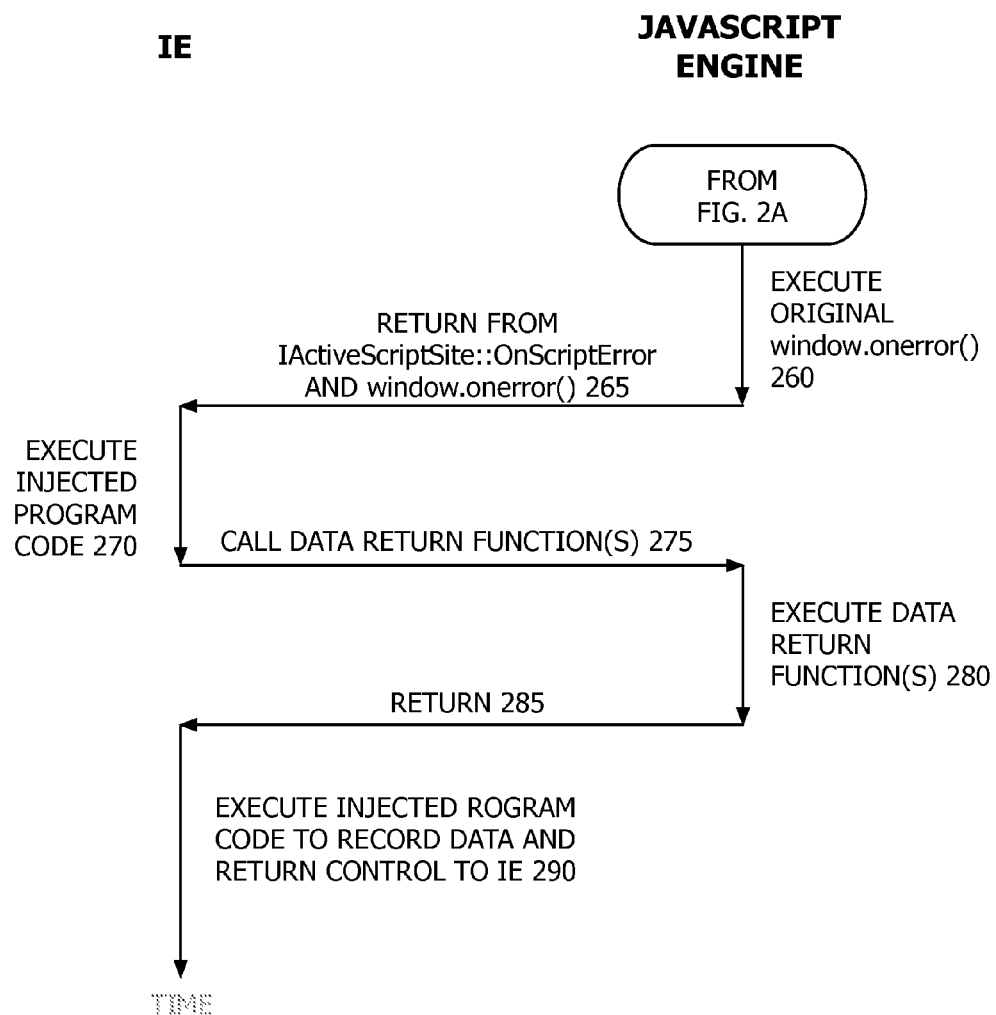

Referring now to FIG. 2B, following execution of the substitute window.onerror( ) function to collect the desired error information as noted above, the scripting engine's original window.onerror( ) function is permitted to execute (260). When complete, both the originally invoked IActiveScriptSite::OnScriptError function and the window.onerror( ) function return (265). IE native program code injected in accordance with 200 is then executed (270), the purpose of which is to call the data return function injected earlier into the scripting engine (275). The injected data return function, in turn, returns the collected information (280, 285). For example, if the collected error information were assigned to a scripting engine's global variable, the data return function would return the value of that variable. On return, IE native program code injected in accordance with 200 receives the error information, records it in some suitable fashion and exits—returning control to original IE program code (290). In one embodiment, the erring script's error information may be written to a log file. In another embodiment, the error information may be entered into a database. In still another embodiment the error information may be passed to another application such as, for example, a JavaScript code development application.

Figure 3:
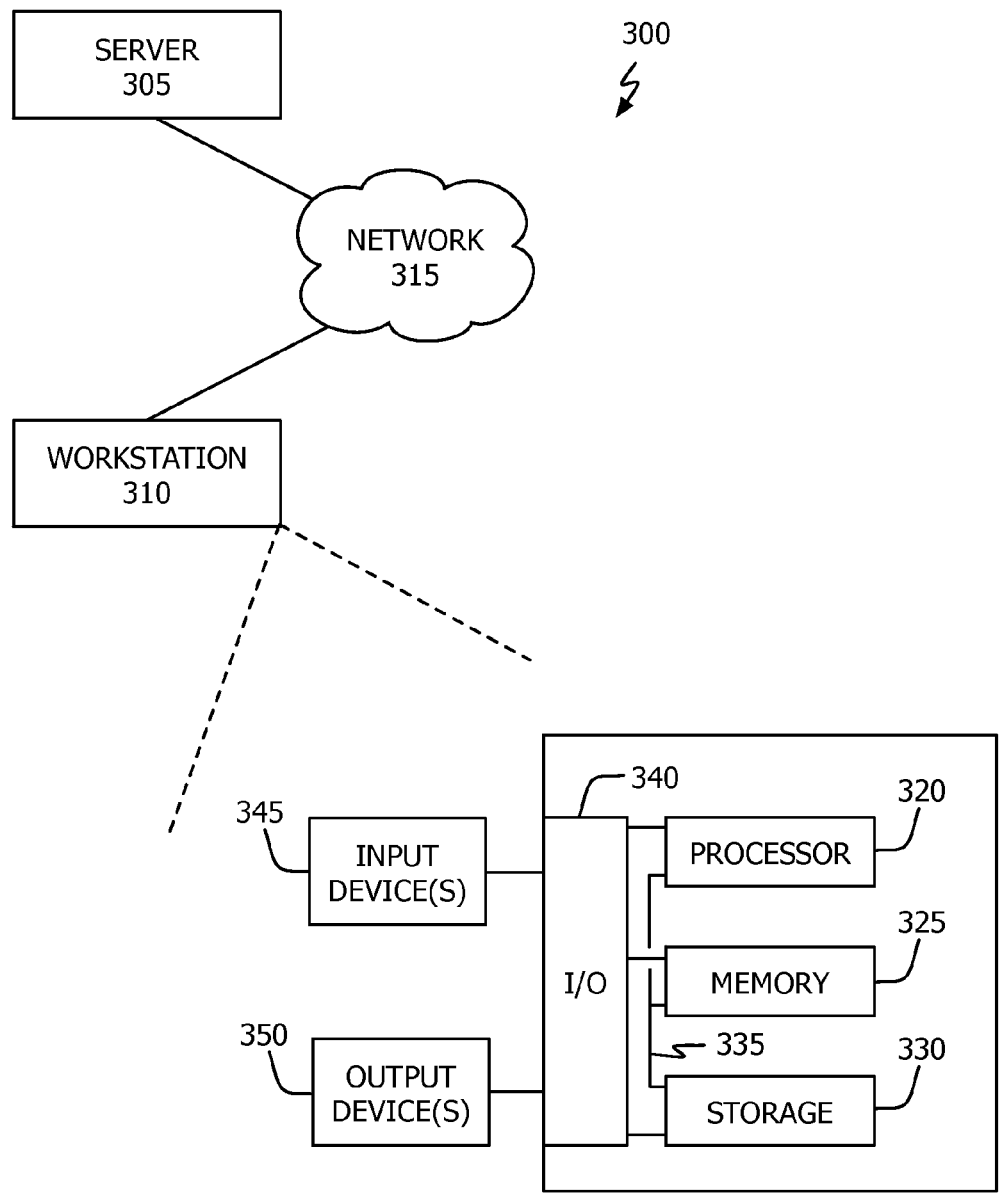
FIG. 3 shows a computer network in accordance with one embodiment.

Referring to FIG. 3, in one embodiment acts in accordance with FIGS. 1 and 2 may be performed by one or more devices such as those shown as part of system 300. As shown, system 300 includes server computer system 305 and workstation computer system 310 interconnected by network 315. It will be recognized that system 300 may include a large number of other devices (only two are shown here for ease of illustration) that may be coupled through multiple networks (all of which are represented by network 315) using any number of technologies (e.g., wireless or wired). Also as shown, illustrative workstation 310 may include processor 320, memory 325 and storage 330 coupled via bus 335. Workstation may also include input/output circuitry 340 through which one or more input devices 345 (e.g., a mouse or light pen) and one or more output devices 350 (e.g., a display monitor) may interact with the rest of the workstation computer system. In one embodiment, computer program code may be stored at workstation 310 on storage 330. On execution, at least a portion of the computer program code may be transferred from storage 330 to memory 325 where it may be executed. When executed, actions in accordance with FIGS. 1 and 2 may be realized.

Various changes in the components and circuit elements, as well as in the details of the illustrated operational methods are possible without departing from the scope of the following claims. For instance, it will be recognized that a CSA may have more than one scripting engine. In such environments, each scripting engine must invoke a unique CSA error function. It is this error function that is instrumented in accordance with this disclosure. Further, it is possible to instrument one or more of these functions in accordance with this disclosure so that script error tracking may be performed on multiple scripting engines for a single CSA.

It will further be recognized that server 305 and workstation 310 may include any programmable control device including, for example, one or more members of the Intel Atom®, Core®, Pentium and Celeron® processor families from Intel Corporation or custom designed state machines. (INTEL, INTEL ATOM, CORE, PENTIUM, and CELERON are registered trademarks of the Intel Corporation.) Either, or both, server 305 and workstation 310 may also be Solaris computer systems. (SOLARIS is a registered trademark of Sun Microsystems, Inc.) Custom designed state machines may be embodied in a hardware device such as an application specific integrated circuits (ASICs) and field programmable gate array (FPGAs).

Storage devices such as storage 330 suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A script error processing method, comprising:
   injecting native program code into a client-side application executing on a computer system, wherein the client-side application is a browser application;
   receiving, by the injected native program code of the browser application, a script error notification from a scripting engine associated with the client-side application;
   in response to receiving the script error notification, injecting, by the injected native program code, script functions into the scripting engine;
   after the script functions are injected, returning, by the scripting engine, control to the client-side application;
   calling, by the client-side application, an error function;
   in response to the calling, executing, by the scripting engine, the first of the injected script functions to collect an erring script's run-time error information;
   calling, by the injected native program code, a second of the injected script functions;
   receiving, by the injected native program code, the erring script's run-time error information from the second of the injected script functions; and
   recording, by the injected native program code, the received collected erring script's run-time error information.

2. The method of claim 1, wherein the act of executing the first of the injected script functions comprises collecting stack trace information for the erring script.

3. The method of claim 2, further comprising assigning the collected stack trace information to a scripting engine variable.

4. The method of claim 2 further comprising executing, by the scripting engine, a standard error function after the act of collecting stack trace information for the erring script.

5. The method of claim 4 further comprising returning execution control to the injected native program code from the scripting engine after the act of executing the standard error function.

6. The method of claim 1, wherein the act of recording comprises storing the collected erring script's run-time error information in a log file.

7. The method of claim 1, wherein the act of recording comprises passing the collected erring script's run-time error information to a second application.

8. The method of claim 7, wherein the second application comprises a script debugging application.

9. The method of claim 1, wherein the client-side application comprises an INTERNET EXPLORER browser application.

10. The method of claim 1, wherein the scripting engine comprises a JAVASCRIPT scripting engine.

11. The method of claim 1, wherein the first and second injected script functions comprise a single script function.

12. A non-transitory program storage device having instructions stored thereon for causing a programmable control device to perform the method of claim 1.

13. A computer network comprising:
a plurality of computing devices communicatively coupled to a computer network; and
a first computing device configured to perform at least a portion of the method of claim 1 wherein the entire method of claim 1 is performed collectively by the plurality of computing devices.

14. A double-code injecting method comprising:
injecting native program code into a browser application executing on a computer system;
receiving, by the injected native program code, from a scripting engine associated with the browser application, a script error notification based on a run-time script error detected by the scripting engine;
in response to receiving the script error notification, injecting, by the injected native program code, script functions into the scripting engine, only after the script error is detected by the scripting engine, the script functions having complete access to an erring script's context within the scripting engine;
executing, by the scripting engine, a first of the injected script functions to collect the erring script's run-time error information;
calling, by the injected native program code, the first of the injected script functions;
receiving, by the injected native program code, the erring script's run-time error information from the first of the injected script functions; and
in response to the receiving, providing, by the injected native program code, the received collected erring script's run-time error information to a debug tool.

* * * * *